(12) United States Patent
Yamane et al.

(10) Patent No.: US 9,127,726 B2
(45) Date of Patent: Sep. 8, 2015

(54) ROTARY DAMPER

(71) Applicant: BIZEN HATSUJO CO., LTD., Okayama-shi, Oakayama (JP)

(72) Inventors: Takeshi Yamane, Okayama (JP); Tokuzo Kobayashi, Okayama (JP); Yasushi Taniguchi, Okayama (JP)

(73) Assignee: BIZEN HATSUJO CO., LTD., Okayama (JP)

(*) Notice: Subject to any disclaimer, the term of this patent is extended or adjusted under 35 U.S.C. 154(b) by 213 days.

(21) Appl. No.: 13/909,851

(22) Filed: Jun. 4, 2013

(65) Prior Publication Data
US 2014/0353093 A1 Dec. 4, 2014

(51) Int. Cl.
| | |
|---|---|
| F16D 49/02 | (2006.01) |
| F16D 49/04 | (2006.01) |
| F16D 49/10 | (2006.01) |
| F16D 49/16 | (2006.01) |
| F16D 49/20 | (2006.01) |
| F16D 49/08 | (2006.01) |

(52) U.S. Cl.
CPC ............. *F16D 49/04* (2013.01); *F16D 49/02* (2013.01); *F16D 49/08* (2013.01); *F16D 49/10* (2013.01); *F16D 49/16* (2013.01); *F16D 49/20* (2013.01)

(58) Field of Classification Search
CPC ......... F16D 49/02; F16D 49/04; F16D 49/08; F16D 49/10; F16D 49/16; F16D 49/20
USPC ........... 188/77 R, 77 W, 82.6, 83; 474/74, 70; 192/41 S, 81 C
See application file for complete search history.

(56) References Cited

U.S. PATENT DOCUMENTS

| | | | | |
|---|---|---|---|---|
| 3,405,929 A | * | 10/1968 | Kaplan | 267/166.1 |
| 5,010,983 A | * | 4/1991 | Kitamura | 188/67 |
| 5,150,771 A | * | 9/1992 | Porter | 188/67 |
| 5,197,704 A | * | 3/1993 | Kitamura | 248/292.11 |
| 5,287,949 A | * | 2/1994 | Kitamura | 188/77 W |
| 5,354,028 A | * | 10/1994 | Kitamura | 248/292.11 |
| 5,771,539 A | * | 6/1998 | Wahlstedt et al. | 16/285 |
| 6,164,419 A | * | 12/2000 | Tribbett | 188/67 |
| 6,164,426 A | * | 12/2000 | Iten | 192/15 |
| 2013/0092501 A1 | * | 4/2013 | Schneider et al. | 192/41 S |

FOREIGN PATENT DOCUMENTS

| | | |
|---|---|---|
| JP | H11-002278 A | 1/1999 |
| JP | 2010-142439 A | 7/2010 |
| JP | 2011-190917 A | 9/2011 |

* cited by examiner

*Primary Examiner* — Thomas Irvin
(74) *Attorney, Agent, or Firm* — DLA Piper LLP (US)

(57) ABSTRACT

The rotary damper includes a brake drum (10) whose either end is integrally connected to the first member (100); a cylindrical case (20) covering the brake drum (10) in a state that the cylindrical case relatively rotates with respect to the brake drum, and being connected to the second member (200) in a state that the cylindrical case rotates in conjugation with the second member; a brake spring (30) being externally fitted to the brake drum (10) with the coil spring tightened, and being configured by a coil spring whose one end is fixed to one end of the cylindrical case (20) and other end is fixed to other end of the cylindrical case. The brake drum (10) is provided with a releasing concave portion (10c) on an outer periphery thereof and fixing portions for winding the brake spring rotating independently from the brake drum.

3 Claims, 6 Drawing Sheets

ROTARY DAMPER

BACKGROUND OF THE INVENTION

1. Field of the Invention

The present invention relates to a rotary damper intervening between two members for generating a rotational resistance when relatively rotating one member with respect to the other member.

2. Description of the Related Art

A rotary damper is intervened between relatively rotating members in order to generate a rotational resistance and to realize heavy motions in such cases as adjusting an angle of a reclining seat, folding a folding seat, folding out or folding a retractable ottoman, opening or closing a hinged door, or opening or closing a lid of apparatuses. The rotary dampers are classified according to operating principles. For example, a rotary damper generating a rotational resistance by utilizing a viscosity resistance of a viscose fluid is known (hereafter sometimes referred to as "viscose fluid utilizing rotary damper"). As for the viscose fluid utilizing rotary damper, one having high functionality such as changing the rotational resistance depending on a rotational direction is proposed (for example, JP 2011-190917 A). However, since the viscose fluid utilizing rotary damper requires high liquid-tight performance, each member configuring the viscose fluid utilizing rotary damper requires high accuracy of dimension. Therefore each member configuring the viscose fluid utilizing rotary damper is normally manufactured by die casting. The viscose fluid utilizing rotary damper has a defect in that when setting the rotational resistance, it is needed to make a new die. This makes a development and design period longer and a manufacturing cost higher. In addition, the viscose fluid utilizing rotary damper has a defect in that it is difficult to downsize and weight save.

A rotary damper having a brake spring configured by a coil spring which is externally fitted to a brake drum with the coil spring tightened is also known (for example, JP11-002278A). This rotary damper generates the rotational resistance by a friction between the brake spring and an outer periphery of the brake drum (hereafter this rotary damper sometimes referred to as "coil spring utilizing rotary damper"). According to the coil spring utilizing rotary damper, the rotational resistance is changed by adjusting coil turns of the brake spring or a position to which ends of the brake spring is fixed. In addition, it is easy to downsize and weight save. However, in case an overmuch load is applied, the brake spring possibly permanently deforms (especially around its ends) in the coil spring utilizing rotary damper. In addition, the coil spring utilizing damper changing the rotational resistance depending on a rotational direction is not found. In relation to this, JP 2010-142439 A discloses an angle adjustable head rest configured to generate different resistance depending on the rotational direction by adapting a coil spring having a small diameter portion at one end and large diameter portion at the other end. However, this coil spring is for locking the head rest at a predetermined angle, but it is not for the rotary damper.

Present invention solves above mentioned problems, makes it possible to set the rotational resistance with an easy adjustment and provides the coil spring utilizing rotary damper easy to downsize, weight save and reduce cost. Present invention also provides the coil spring utilizing rotary damper in which the brake spring does not permanently deform by a prolonged use. Further, present invention provides the coil spring utilizing damper in which complicated functions such as changing the rotational resistance depending on the rotational direction are easy to realize.

SUMMARY OF THE INVENTION

Above mentioned problem is solved through a rotary damper intervening between a first member and a second member for generating a rotational resistance when relatively rotating the second member with respect to the first member. The rotary damper includes: a brake drum whose either end being integrally connected to the first member; a cylindrical case covering the brake drum in a state that the cylindrical case relatively rotates with respect to the brake drum, and being connected to the second member in a state that the cylindrical case rotates in conjugation with the second member; and a brake spring being externally fitted to the brake drum with the coil spring tightened, and being configured by a coil spring whose one end is fixed to one end of the cylindrical case and other end is fixed to other end of the cylindrical case. The brake drum is provided with a releasing concave portion on an outer periphery of a section to which the brake spring is externally fitted. The releasing concave portion is provided in an outer peripheral direction of the brake drum. Fixing portions for winding the brake spring are provided at both ends of the section. The fixing portions rotate independently from the brake drum. The one end and the other end of the brake spring are externally fitted to the fixing portions.

According to the rotary dumper of present invention, in case the second member is intended to relatively rotate with respect to the first member, the cylindrical case tries rotating in conjugation with the second member. However, the one end and the other end of the brake spring, which is externally fitted to the brake drum with the coil spring tightened, are fixed to the cylindrical case. Therefore when relatively rotating the second member with respect to the first member, an inner periphery of the brake spring tightens the outer periphery of the brake drum. A resistance arose from this tightening becomes the rotational resistance (a torque). This resistance arises at a portion where the brake spring contacts with the outer periphery of the brake drum, and does not arise at a portion on the outer periphery of the brake spring where the releasing concave portion is provided. According to the rotary damper of the present invention, the rotational resistance is readily adjusted by modifying a size, a shape or a placement of the releasing concave portion. Concrete examples are aforementioned. Each member configuring the rotary damper of the present invention is manufactured by a press working or a mold injection because the rotary damper does not need to be liquid-tight. Furthermore, a weight saving, a downsizing and a cost reducing is readily attained. Still further, in case a load is applied between the first member and the second member, fixing portions are tightened. A large load is not locally applied to the one end and the other end of the brake spring since predetermined coil turns of the one end and the other end of the brake spring are externally fitted to the fixing portions which rotate independently from the brake drum. Therefore the brake spring is not easily deformed.

According to the rotary damper of the present invention, a configuration of the cylindrical case is not particularly limited. However, it is preferable that cylindrical case is configured to be divided into a first case to which the one end of the brake spring is fixed and the second case to which the other end of the brake spring is fixed. The first case has a plurality of engagement protrusions protruding inward and provided in an inner peripheral direction on an inner periphery of an end portion on a second case side. The second case has a plurality of engagement protrusions protruding outward to engage the plurality of engagement protrusions protruding inward, and the plurality of engagement protrusions protruding outward is provided in an outer peripheral direction on an outer periphery of an end portion on a first case side. By adapting this configuration to the brake drum provided with the releasing concave portion, the engagement protrusions protruding inward and the engagement protrusions protruding outward which engage each other can be modified to adjust an assembling angle of the second case with respect to the first case. Therefore, by adjusting a relative positional relationship of one end and the other end of the brake spring, a tightening force of the brake spring with respect to the brake drum can be adjusted. The same effect obtained by this configuration is also obtainable according to a configuration that the first case has a plurality of engagement protrusions protruding outward and provided in an outer peripheral direction on an outer periphery of an end portion on a second case side; and the second case has a plurality of engagement protrusions protruding inward to engage the plurality of engagement protrusions protruding outward, and the plurality of engagement protrusions protruding inward is provided in an inner peripheral direction on an inner periphery of an end portion on a first case side.

By the way, the brake drum is provided with the releasing concave portion in the rotary damper of the present invention. In case the brake drum is a mold injected article made of a synthetic resin, a mold (three-part mold) moving in a radial direction of the brake drum is required in addition to two molds (two-part mold) moving in longitudinal direction of the brake drum considering a convenience of demolding. However, the brake drum is shaped by the injection molding using a two-part mold by providing a plurality of demolding concave portions on the brake drum. The plurality of demolding concave portions extends from the both ends of the section to which the brake spring is externally fitted to the releasing concave portion. The plurality of demolding concave portions is provided intermittently in an outer peripheral direction of the brake drum. The plurality of demolding concave portions on one end side of the brake drum and the plurality of demolding concave portions on other end side of the brake drum are alternatively provided in outer peripheral direction of the brake drum. The plurality of demolding concave portions also functions as a plurality of grease storing concave portions for storing grease.

The present invention solves above mentioned problems and is able to set the rotational resistance with easy adjustment and is able to provide the coil spring utilizing rotary damper easy to downsize, weight save and reduce cost. Present invention is also able to provide the coil spring utilizing rotary damper in which the brake spring is not permanently deform by a prolonged use. Further, present invention is able to provide the coil spring utilizing damper in which complicated functions such as changing the rotational resistance depending on the rotational direction are easy to realize.

DETAILED DESCRIPTION OF THE PREFERRED EMBODIMENTS

Outline of a Rotary Damper of the Present Invention

Figure 1:
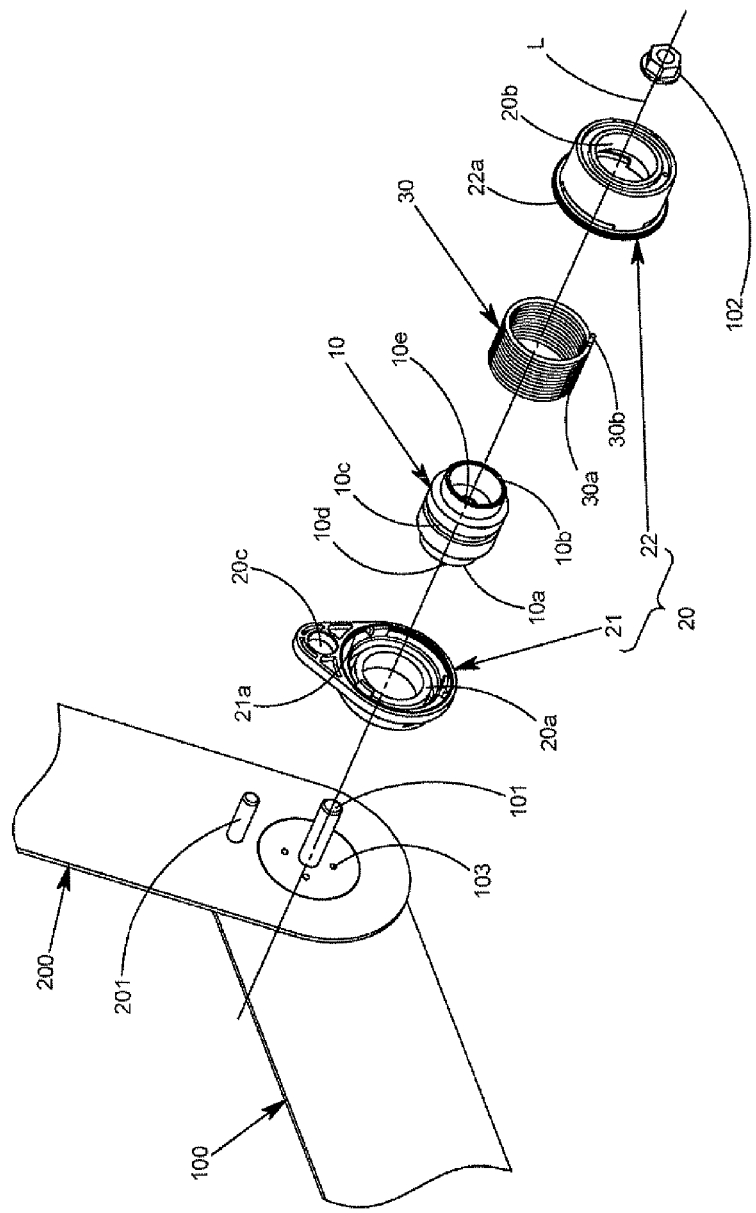
FIG. 1 is a perspective view illustrating a first embodiment of a rotary damper in which the rotary damper is disassembled to each component part.
Figure 2:
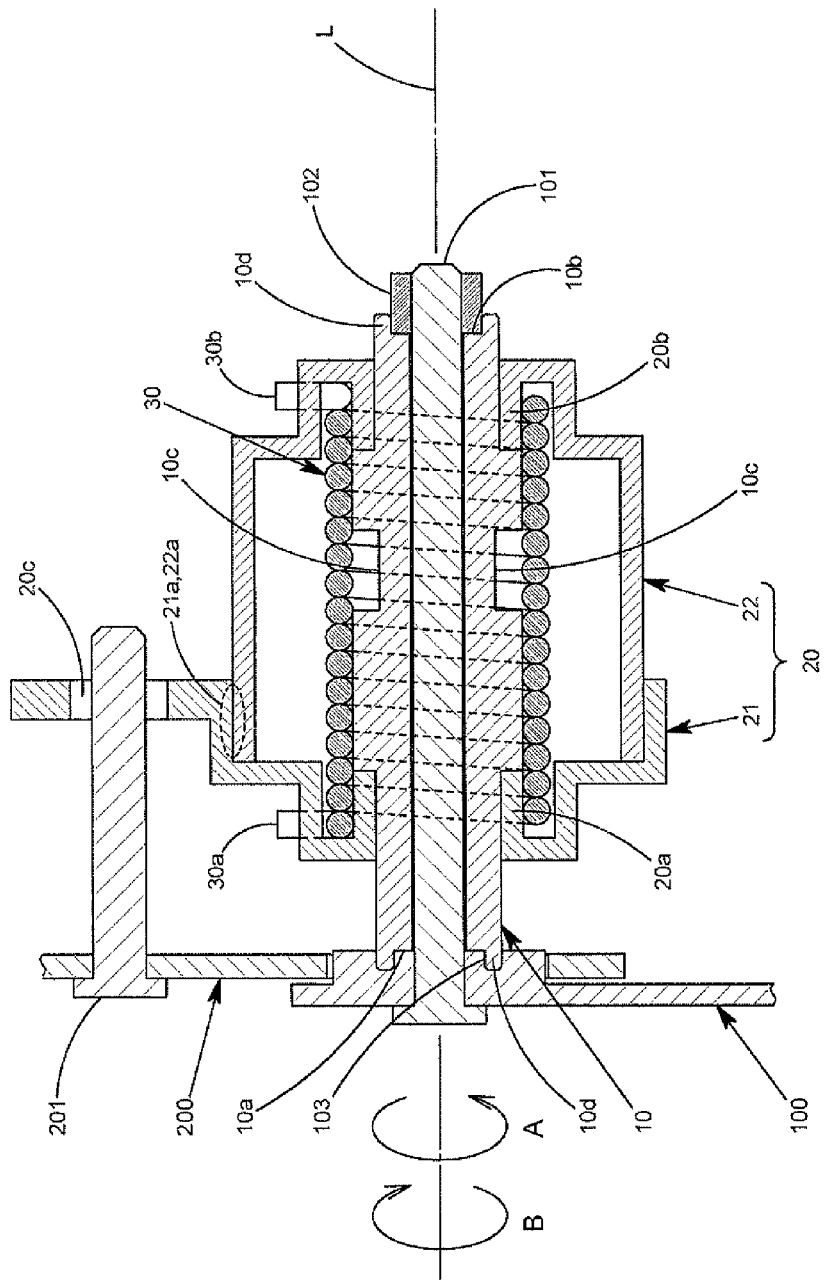
FIG. 2 is a cross sectional view cut across a plane including a center line of a brake drum of the first embodiment of the rotary damper.
Figure 3:
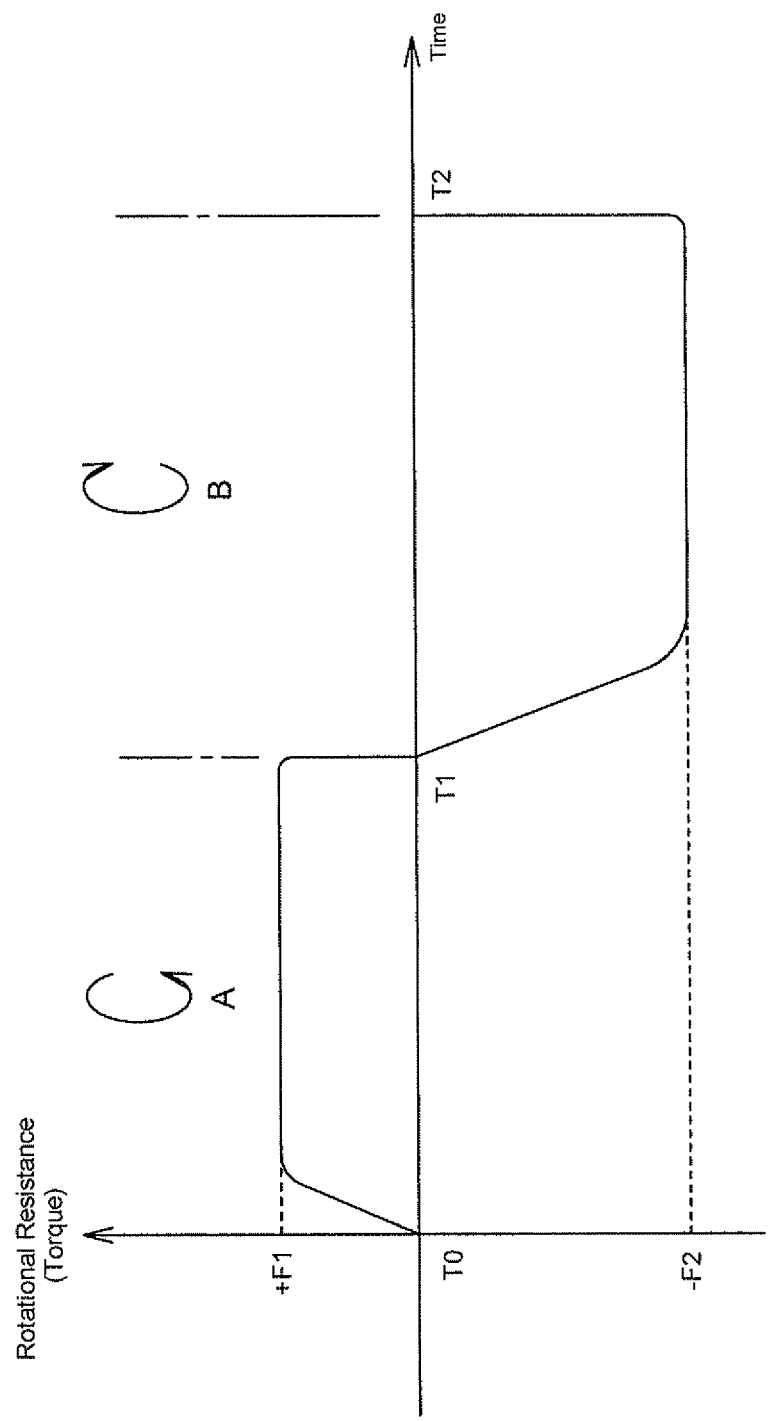
FIG. 3 is a graph explaining anisotropy of a rotational resistance (torque) of the first embodiment of the rotary damper.

Preferred embodiments of the rotary damper of the present invention is explained with reference to Figs. FIG. 1 is a perspective view illustrating a first embodiment of a rotary damper in which the rotary damper is disassembled to each component part. FIG. 2 is a cross sectional view cut across a plane including a center line (L) of a brake drum 10 of the first embodiment of the rotary damper. FIG. 3 is a graph explaining anisotropy of a rotational resistance (torque) of the first embodiment of the rotary damper.

As illustrated in FIGS. 1 and 2, the rotary damper of the first embodiment is intervened between a first member 100 and a second member 200. This rotary damper is configured by the brake drum 10, a cylindrical case 20, and a brake spring 30. The brake drum 10 is externally fitted to an axis member (bolt) 101 and is retained by a retaining member (nut) 102. The brake drum 10 is integrally connected to the first member 100 by fitting protrusions 10d provided on its one end 10a to fitting holes 103 of the first member 100. A cylindrical case 20 covers the brake drum 10 in a state that the cylindrical case 20 relatively rotates with respect to the brake drum 10. The cylindrical case 20 rotates in conjugation with the second member 200 by inserting an axis member (bolt) 201 protruding from the second member 200 with some play to a through hole 20c provided on a flange portion protruding from an outer periphery of the cylindrical case 20. Further, a section of the brake spring 30 except for both ends of the brake spring 30 are externally fitted to the brake drum 10 with a coil spring 30 tightened. Predetermined coil turns of one end 30a and other end of 30b of the brake spring 30 is externally fitted to fixing portions 20a, 20b for winding the brake spring 30 with the coil spring 30 tightened. A releasing concave portion 10c is provided at an intermediate portion of the brake drum 10 along its outer periphery and prevents a fastening force from being applied at this portion to divide a fastening effect of the brake spring 30.

As illustrated in FIGS. 1 and 2, according to the first embodiment of the rotary damper, the cylindrical case 20 is configured to be divided into a first case 21 to which the one end 30a of the brake spring 30 is fixed and a second case 22 to which the other end 30b is fixed. The first case 21 has a plurality of engagement protrusions 21a protruding inward and provided in an inner peripheral direction on an inner periphery of an end portion on a second case 22 side. The second case 22 has a plurality of engagement protrusions 22a protruding outward provided in an outer peripheral direction on an outer periphery of an end portion on a first case 21 side. Therefore, by modifying the engagement protrusions 21a protruding inward and the engagement protrusions 22a protruding outward which engage each other, an assembling angle of the second case 22 with respect to the first case 21 is adjusted. Fixing portions 20a, 20b for externally fitting predetermined coil turns of the one end 30a and the other end 30b are respectively provided inside the first case 21 and the second case 22. Although a pair of flange portions integrally provided inside the cylindrical case 20 are utilized as the fixing portions 20a, 20b, the fixing portions 20a, 20b may be separate members independent from the cylindrical case 20.

Position of the releasing concaved portion 10c is arbitrarily determined considering a function required for the rotary damper. In the first embodiment of the rotary damper, the releasing concaved portion 10c is provided at a position displaced to the other end 30b side of the coil spring 30 seen from the intermediate portion of the brake drum 10 to which the brake spring 30 is externally fitted. By selecting a position to provide the releasing concaved portion 10c, it is possible to generate a difference (bring anisotropy) between the rotational resistances when relatively rotating the second member 200 with respect to the first member 100 in one direction (in the direction of arrow A in FIG. 2) and in other direction (in the direction of arrow B in FIG. 2). The reason is following. By providing the releasing concaved portion 10c, a fastening effect of the brake spring 30 is divided. When relatively rotating the second member 200 with respect to the first member 100, one end of the brake spring 30 is pulled in a direction of tightening the brake spring 30 and the other end is pushed in a direction of loosening the brake spring 30. The brake spring 30 tightens in a section on said one end side seen from the intermediate portion and looses in a section on said other end side. Besides, since effective coil turns are made different on the one end 30a side and the other end 30b side by providing the releasing concave portion 10c on above said position, the difference of the effective coil turns appears as the difference of the rotational resistance.

Figure 4:
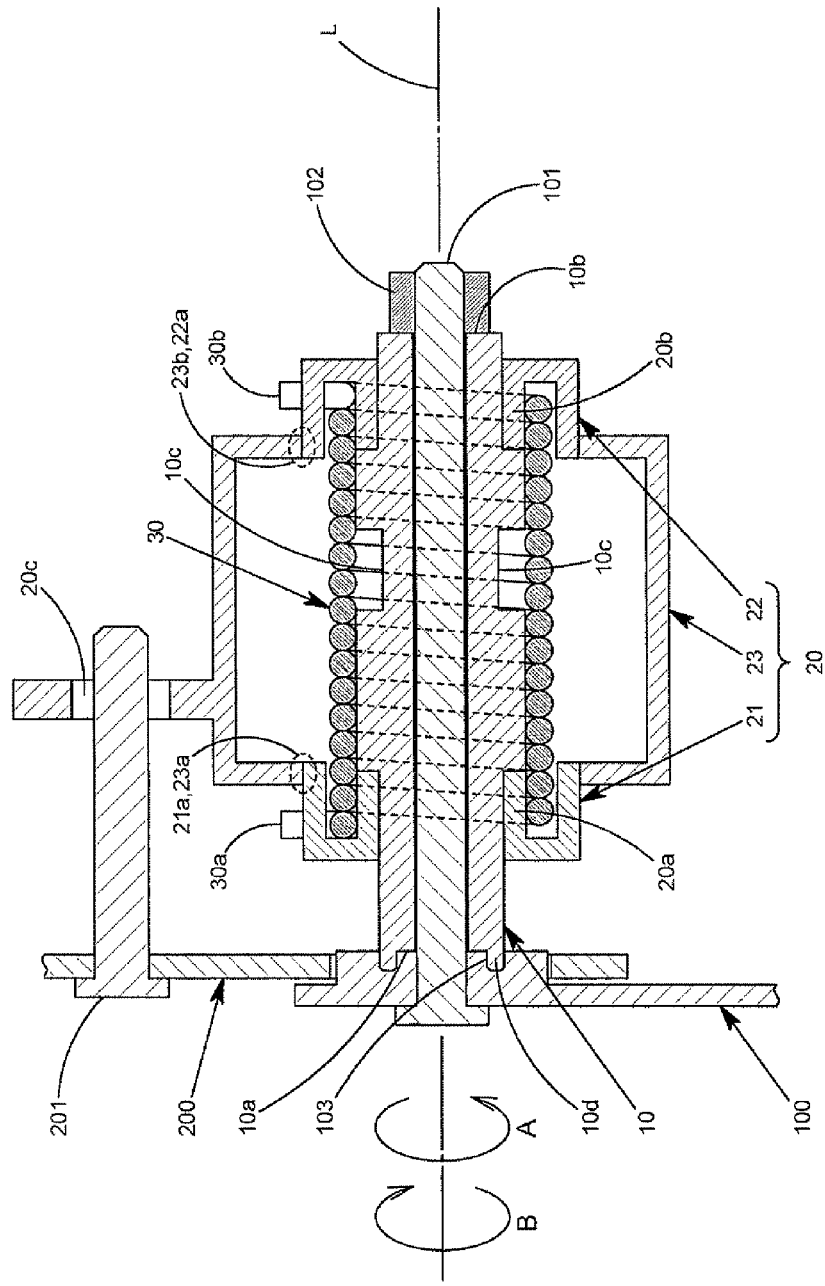
FIG. 4 is a cross sectional view cut across a plane including a center line of a brake drum of a second embodiment of the rotary damper.

FIG. 4 is a cross sectional view cut across a plane including a center line (L) of a brake drum 10 of a second embodiment of the rotary damper. A third case 23 is provided between a first case 21 and a second case 22 in the second embodiment of the rotary damper as illustrated in FIG. 4. The third case 23 has a plurality of engagement protrusions protruding inward in an inner peripheral direction on inner periphery of one end 23a and other end 23b respectively. The plurality of engagement protrusions of the third case 23 engages to protrusions protruding outward on an outer periphery of the first case 21 and the second case 22 to integrate a cylindrical case 20. The flange having a through hole 20c is provided on an outer periphery of the third case 23. Since other configurations are approximately same as the first embodiment, explanations are omitted.

Figure 5:
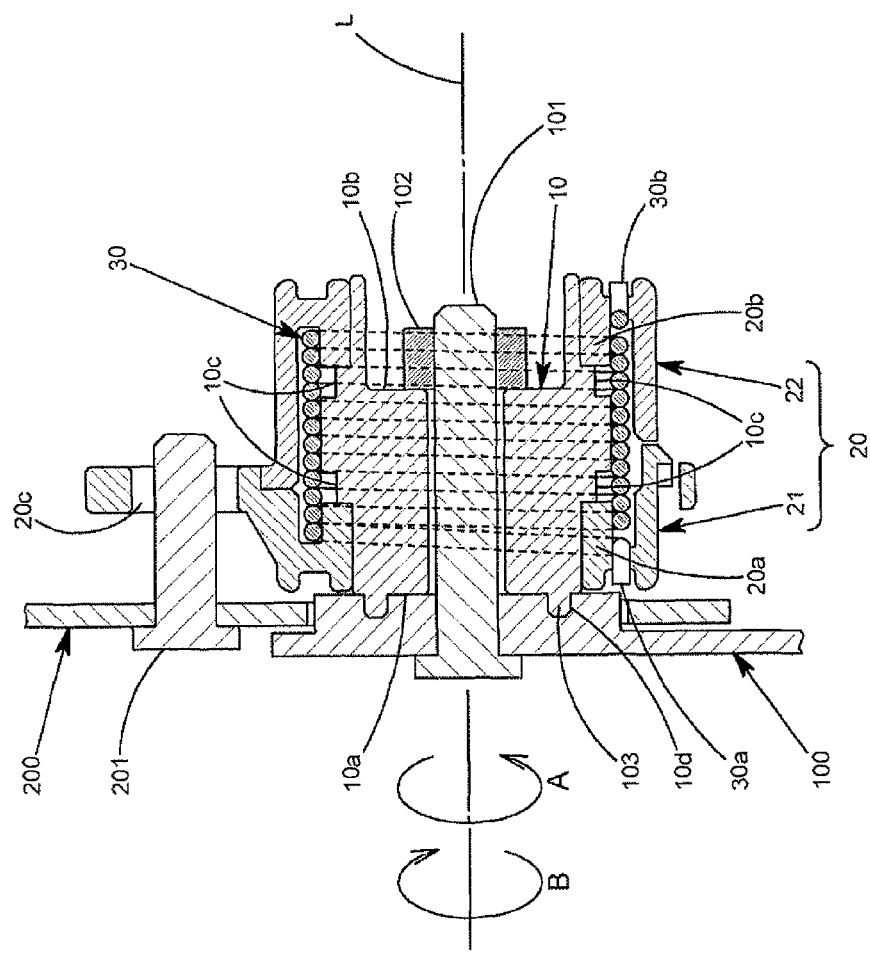
FIG. 5 is a cross sectional view cut across a plane including a center line of a brake drum of a third embodiment of the rotary damper.

FIG. 5 is a cross sectional view cut across a plane including a center line (L) of a brake drum 10 of a third embodiment of the rotary damper. The rotary damper of the third embodiment has two releasing concave portions 10c. Respective releasing concaved portions 10c are provided at portions which are the same distance away from an intermediate portion of a section of a brake drum 10 to which a brake spring 30 is externally fitted. By providing releasing concaved portions 10c at a position symmetrical to the intermediate portion, effective coil turns on one end 30a side of the brake spring and effective coil turns on other end 30b side become equal. Therefore, when rotating a second member 200 with respect to a first member 100, rotating resistance in one direction (in the direction of arrow A in FIG. 5) and rotating resistance in other direction (in the direction of arrow B in FIG. 5) become equal.

Figure 6:
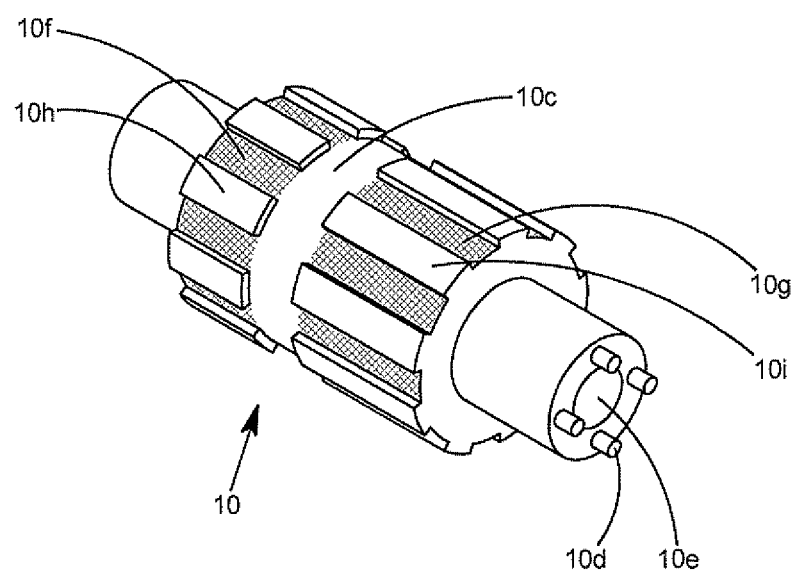
FIG. 6 is a perspective view illustrating a brake drum of a fourth embodiment of the rotary damper.

FIG. 6 is a perspective view illustrating a brake drum of a fourth embodiment of the rotary damper. The fourth embodiment of the rotary damper has a plurality of demolding concave portions 10f, 10g (cross hatched portions in FIG. 6) extending from a both ends of its large diameter portion (a section to which a brake spring 30 is externally fitted) to a releasing concave portion 10c. The plurality of demolding concave portions 10f, 10g is provided intermittently on outer periphery of a brake drum 10. The brake spring 30 is tightened with respect to a top plane of a protruding portion 10h on an outer periphery of the brake drum 10. The plurality of demolding concave portions 10f on one end side of the drake drum 10 and the plurality of demolding concave portions 10g on other end side are alternatively provided to shape the brake drum with an injection molding using a two-part mold. This brake drum 10 is preferably shaped with the injection molding using a synthetic resin.

Use of above explained rotary damper of present invention is not particularly limited. The rotary damper is adaptable for various uses. For example, the rotary damper is adaptable for a folding mechanism of folding seats, an angle adjusting mechanism for reclining seats, head rests, arm rests and ottomans, an opening and closing mechanism for doors. Since the rotary damper of the present invention is easy to downsize and cost reduce, the rotary damper is preferably adaptable for mechanisms of automobiles where the downsizing and the cost reducing are highly demanded.

The invention claimed is:

1. A rotary damper intervening between a first member and a second member for generating a rotational resistance when relatively rotating the second member with respect to the first member, comprising:
   a brake drum whose either end being integrally connected to the first member;
   a cylindrical case covering the brake drum in a state that the cylindrical case relatively rotates with respect to the brake drum, and being connected to the second member in a state that the cylindrical case rotates in conjugation with the second member; and
   a brake spring being externally fitted to the brake drum with the coil spring tightened, and being configured by a coil spring whose one end is fixed to one end of the cylindrical case and other end is fixed to other end of the cylindrical case;
   wherein the brake drum is provided with a releasing concave portion on an outer periphery of a section to which the brake spring is externally fitted, the releasing concave portion is provided in an outer peripheral direction of the brake drum,
   fixing portions for winding the brake spring are provided at both ends of said section, the fixing portions rotate independently from the brake drum, the one end and the other end of the brake spring are externally fitted to the fixing portions.

2. The rotary damper according to claim 1,
   wherein the cylindrical case is configured to be divided into a first case to which the one end of the brake spring is fixed and the second case to which the other end of the brake spring is fixed,
   the first case has a plurality of engagement protrusions protruding inward and provided in an inner peripheral direction on an inner periphery of an end portion on a second case side; and the second case has a plurality of engagement protrusions protruding outward to engage the plurality of engagement protrusions protruding inward, and the plurality of engagement protrusions protruding outward is provided in an outer peripheral direction on an outer periphery of an end portion on a first case side: or
   the first case has a plurality of engagement protrusions protruding outward and provided in an outer peripheral direction on an outer periphery of an end portion on a second case side; and the second case has a plurality of engagement protrusions protruding inward to engage the plurality of engagement protrusions protruding outward, and the plurality of engagement protrusions protruding inward is provided in an inner peripheral direction on an inner periphery of an end portion on a first case side.

3. The rotary damper according to claim 1,
wherein the brake drum has a plurality of demolding concave portions,
the plurality of demolding concave portions extends from the both ends of the section to which the brake spring is externally fitted to the releasing concave portion and is provided intermittently in an outer peripheral direction of the brake drum,
the plurality of demolding concave portions on one end side of the brake drum and the plurality of demolding concave portions on other end side of the brake drum are alternatively provided in outer peripheral direction of the brake drum.

\* \* \* \* \*